(12) United States Patent
Zhang et al.

(10) Patent No.: US 11,985,581 B2
(45) Date of Patent: May 14, 2024

(54) CALL METHOD AND TERMINAL DEVICE

(71) Applicant: Huawei Technologies Co., Ltd., Shenzhen (CN)

(72) Inventors: Qi Zhang, Xi'an (CN); Yanbin Ma, Xi'an (CN); Minghui Chen, Xi'an (CN); Fei Luo, Shenzhen (CN); Dong Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 17/312,798

(22) PCT Filed: Dec. 11, 2018

(86) PCT No.: PCT/CN2018/120414
§ 371 (c)(1),
(2) Date: Jun. 10, 2021

(87) PCT Pub. No.: WO2020/118537
PCT Pub. Date: Jun. 18, 2020

(65) Prior Publication Data
US 2022/0060876 A1    Feb. 24, 2022

(51) Int. Cl.
*H04W 4/90* (2018.01)
*H04W 8/08* (2009.01)

(52) U.S. Cl.
CPC .............. *H04W 4/90* (2018.02); *H04W 8/08* (2013.01)

(58) Field of Classification Search
CPC ............ H04W 4/90; H04W 8/08; H04W 4/02
See application file for complete search history.

(56) References Cited

U.S. PATENT DOCUMENTS

| | | | |
|---|---|---|---|
| 8,249,549 B1 * | 8/2012 | Rahman | H04M 3/42306 455/404.2 |
| 2006/0172720 A1 | 8/2006 | Islam et al. | |
| 2015/0065077 A1 * | 3/2015 | Kim | H04W 4/90 455/404.1 |

FOREIGN PATENT DOCUMENTS

| | | |
|---|---|---|
| CN | 101212801 A | 7/2008 |
| CN | 105101135 A | 11/2015 |
| CN | 105848103 A | 8/2016 |
| CN | 105848121 A | 8/2016 |
| CN | 111279670 A | 6/2020 |
| EP | 2966840 A1 | 1/2016 |

(Continued)

*Primary Examiner* — Umair Ahsan
(74) *Attorney, Agent, or Firm* — Slater Matsil, LLP

(57) ABSTRACT

This application provides a call method and a terminal device. The method includes: when roaming from a home public land mobile network (HPLMN) to a visited public land mobile network (VPLMN), a terminal device obtains a first emergency number list of the VPLMN, and the emergency number corresponds to at least one emergency service type; the terminal device obtains a first number, and when the first number is an emergency number in a second emergency number list of the HPLMN and the first number is not an emergency number in the first emergency number list, determines a second number based on the first number, where the second number is the emergency number in the first emergency number list, and the second number and the first number correspond to a same emergency service type; and the terminal device initiates an emergency call based on the second number.

14 Claims, 12 Drawing Sheets

(56) References Cited

FOREIGN PATENT DOCUMENTS

IN           106792609 A    5/2017
WO     WO-03015378 A1 *  2/2003  ............ H04M 1/271

* cited by examiner

CALL METHOD AND TERMINAL DEVICE

CROSS-REFERENCE TO RELATED APPLICATIONS

This application is a national stage of International Application No. PCT/CN2018/120414, filed on Dec. 11, 2018, which is hereby incorporated by reference in its entirety.

TECHNICAL FIELD

This application relates to the field of wireless communications technologies, and in particular, to a call method and a terminal device.

BACKGROUND

When encountering an emergency (for example, endangering personal safety), a user may dial a specific emergency number by using a terminal device to obtain an emergency rescue service. Usually, emergency numbers are fixed numbers in a country or region. For example, in China, the police emergency number is 110.

Emergency numbers of different countries or regions are different. Therefore, the user can quickly dial a corresponding emergency number only when the user is familiar with emergency numbers of the user's country. However, if the user is traveling abroad or on a business trip, the user may not be able to timely and accurately dial a corresponding emergency number because the user does not know local emergency numbers. In this case, life safety of the user may be endangered.

SUMMARY

An objective of embodiments of this application is to provide a call method and a terminal device, so as to resolve a problem of how a user accurately dials an emergency number in a different region or country.

According to a first aspect, an embodiment of this application provides a call method, including: When roaming from a home public land mobile network HPLMN to a visited public land mobile network VPLMN, a terminal device obtains a first emergency number list of the VPLMN, where the first emergency number list includes at least one emergency number, and the emergency number corresponds to at least one emergency service type; the terminal device obtains a first number, and when the first number is an emergency number in a second emergency number list of the HPLMN and the first number is not an emergency number in the first emergency number list, determines a second number based on the first number, where the second number is an emergency number in the first emergency number list, and the second number and the first number correspond to a same emergency service type; and the terminal device initiates an emergency call based on the second number.

According to the foregoing method, when the first number is the emergency number in the second emergency number list and is not the emergency number in the first emergency number list, the terminal device may adaptively convert the first number into the second number. Because the second number is an emergency number in a roaming area, a user may also initiate an emergency call by using an emergency number of the HPLMN through the terminal device, so as to resolve a problem that the user cannot accurately dial an emergency number in a different region or country.

In a possible implementation, when the first number is the emergency number in the second emergency number list and the first number is the emergency number in the first emergency number list, the terminal device displays a first emergency service type corresponding to the first number in the first emergency number list and a second emergency service type corresponding to the first number in the second emergency number list; and when obtaining an instruction for making a call based on the second emergency service type, the terminal device initiates an emergency call based on the first number.

According to the foregoing method, when the first number is the emergency number in the second emergency number list and is the emergency number in the first emergency number list, the terminal device may display two emergency service types of the first number for the user to select, so that the user can determine a finally required emergency service type, to improve accuracy of dialing the emergency number.

In a possible implementation, when obtaining an instruction for making a call based on the first emergency service type, the terminal device determines the second number based on the first number; and the terminal device initiates the emergency call based on the second number.

In a possible implementation, that the terminal device determines the second number based on the first number includes: When uniquely determining, from the second emergency number list based on at least one emergency service type corresponding to the first number in the first emergency number list, an emergency number that corresponds to a same or partially same emergency service type as the at least one emergency service type corresponding to the first number, the terminal device uses the determined emergency number as the second number.

In a possible implementation, that the terminal device determines the second number based on the first number includes: When determining M emergency numbers from the second emergency number list based on at least one emergency service type corresponding to the first number in the first emergency number list, the terminal device determines the second number from the M emergency numbers, where M is an integer greater than 1, and for any one of the M emergency numbers, an emergency service type corresponding to the emergency number in the second emergency number list is the same as or partially the same as the at least one emergency service type corresponding to the first number in the first emergency number list.

In a possible implementation, that the terminal device determines the second number from the M emergency numbers includes: The terminal device displays the M emergency numbers and emergency service types of the M emergency numbers, and determines the second number according to a received number selection instruction, where the number selection instruction is used to select an emergency number from the M emergency numbers as the second number.

According to the foregoing method, when the terminal device determines the M emergency numbers from the second emergency number list, the terminal device may display the M emergency numbers and the emergency service types of the M emergency numbers for the user to select, so that the user can determine a finally required emergency service type, to improve accuracy of dialing the emergency number.

In a possible implementation, that the terminal device determines the second number from the M emergency numbers includes: The terminal device converts the M emergency numbers and emergency service types of the M emergency numbers into a voice for playing, and determines the second number according to a received number selection instruction, where the number selection instruction is used to select an emergency number from the M emergency numbers as the second number.

According to the foregoing method, when the terminal device determines the M emergency numbers from the second emergency number list, the terminal device may send a voice notification to the user, so that the user can determine a finally required emergency service type, to improve accuracy of dialing the emergency number.

In a possible implementation, if the first number is not the emergency number in the second emergency number list and the first number is the emergency number in the first emergency number list, the terminal device initiates the emergency call based on the first number.

In a possible implementation, that the terminal device obtains a first emergency number list of the VPLMN includes:

The terminal device determines, based on an identifier of the VPLMN, an emergency number list that is in a globalization parameter configuration file stored in the terminal device and that is mapped to the identifier of the VPLMN as the first emergency number list.

According to a second aspect, an embodiment of this application provides a terminal device. The terminal device includes at least one processor and a memory, and the at least one processor is configured to read and execute computer instructions stored in the memory, to perform the method in any one of the first aspect or the possible designs of the first aspect. Optionally, the terminal device may further include a transceiver, configured to support the terminal device in sending and/or receiving information in the foregoing method. Optionally, the terminal device may be a terminal device, or may be an apparatus in the terminal device, for example, a chip or a chip system. The chip system includes at least one chip, and the chip system may further include another circuit structure and/or a discrete device.

According to a third aspect, an embodiment of this application provides a terminal device, configured to implement the first aspect or any method in the first aspect, and includes corresponding functional modules, for example, a processing unit, a transceiver unit, and a display unit, and are separately configured to implement steps in the foregoing method.

An embodiment of this application provides a terminal device, including a memory and at least one processor. The memory is configured to store instructions, the at least one processor is configured to execute the instructions stored in the memory, and execution of the instructions stored in the memory enables the at least one processor to configure to perform the method in any one of the foregoing possible designs.

An embodiment of this application provides a computer-readable storage medium. The computer storage medium stores computer-readable instructions. When a computer reads and executes the computer-readable instructions, a terminal device is enabled to perform the method according to any one of the foregoing possible designs.

An embodiment of this application provides a computer program product. When a computer reads and executes the computer program product, a terminal device is enabled to perform the method in any one of the foregoing possible designs.

An embodiment of this application provides a chip. The chip is connected to a memory, and is configured to read and execute a software program stored in the memory, to implement the method according to any one of the foregoing possible designs.

DETAILED DESCRIPTION OF ILLUSTRATIVE EMBODIMENTS

The following further describes in detail embodiments of this application with reference to the accompanying drawings.

The embodiments of this application may be applied to various mobile communications systems, for example, a new radio (new radio, NR) system, a global system for mobile communications (global system for mobile communication, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, a long term evolution-advanced (long term evolution-advanced, LTE-A) system, a universal mobile telecommunications system (universal mobile telecommunications system, UMTS), an evolved long term evolution (evolved long term evolution, eLTE) system, a future communications system, and the like. Specifically, this is not limited herein.

In the embodiments of this application, a terminal device may be a device having a wireless transceiver function or a chip that may be disposed on any device, and may also be referred to as user equipment (user equipment, UE), an access terminal, a subscriber unit, a subscriber station, a mobile station, a mobile console, a remote station, a remote terminal, a mobile device, a user terminal, a wireless communications device, a user agent, or a user apparatus. The terminal device in the embodiments of this application may be a mobile phone (mobile phone), a tablet computer (Pad), a computer having a wireless transceiver function, a virtual reality (virtual reality, VR) terminal, an augmented reality (augmented reality, AR) terminal, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

Figure 1:
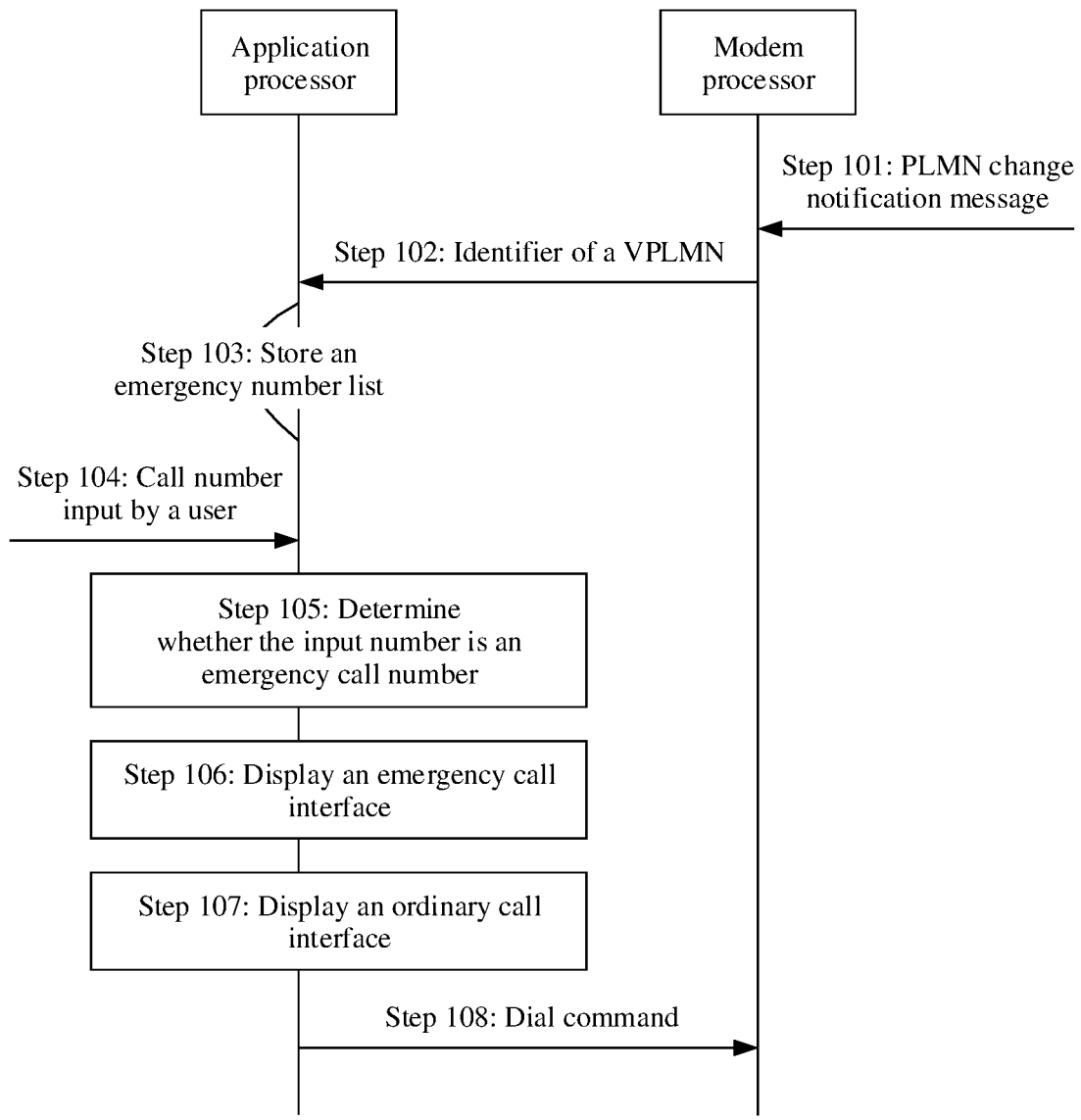
FIG. 1 is a schematic diagram of a call flow of an emergency number in the prior art.

FIG. 1 is a schematic diagram of a call flow of an emergency number in the prior art. In FIG. 1, when a terminal device camps on a home public land mobile network (home public land mobile network, HPLMN), the terminal device stores an emergency number list corresponding to the HPLMN.

It should be noted that the terminal device stores a globalization parameter configuration file, and the globalization parameter configuration file includes each emergency number list corresponding to each public land mobile network (public land mobile network, PLMN). There is a correspondence between the emergency number list and an identifier of the PLMN, and the terminal device may obtain, based on the identifier of the PLMN, the emergency number list corresponding to the PLMN from the globalization parameter configuration file.

It should be noted that although each country or region has a different emergency number, a user dials an emergency number for a same reason. For example, in a case of fire, the user needs to dial a fire alarm number, and in a case of illness, the user needs to dial a first aid number. Therefore, the 3rd generation partnership project (the 3rd generation partnership project, 3GPP) defines a plurality of emergency service types (emergency service type) in the globalization parameter configuration file, and each emergency service type corresponds to a corresponding emergency number in a different country or region. Therefore, in the globalization parameter configuration file, each emergency number list includes at least one emergency number, and each emergency number corresponds to at least one emergency service type.

In an existing standard, the emergency number list may have two different forms. In a first form, if a core network in a mobile network uses a circuit switched domain (circuit switched domain, CS) technology, the emergency number list may be shown in Table 1.

TABLE 1

| Emergency number | Type (category) identifier | Emergency service type |
|---|---|---|
| Number 1 | 1 | Police |
| Number 2 | 2 | First aid |
| Number 3 | 4 | Fire alarm |
| Number 4 | 8 | Coast guard |
| Number 5 | 16 | Mountain rescue |
| Number 6 | 128 | Default value |

In Table 1, the number 1 to the number 6 are determined based on a different country or region. For example, in China, the number 1 corresponding to the police is no, the number 2 corresponding to the first aid is 120, and the number 3 corresponding to the fire alarm is 119. Details are not described herein. The type identifier is used to identify an emergency service type. When the terminal device obtains an emergency number, the terminal device needs to determine a type identifier of the emergency number based on the emergency number, so that the terminal device can determine an emergency service type of the emergency number based on the type identifier. For example, if the terminal device obtains the number 1, the terminal device determines, based on the number 1, that the type identifier is 1. Therefore, the terminal device may determine that the number 1 is a police number.

In a second form, if a core network in a mobile network uses an internet protocol multimedia subsystem (internet protocol multimedia subsystem, IMS) technology, the emergency number list may be shown in Table 2.

TABLE 2

| Emergency number | Uniform resource name (uniform resource name, URN) of an emergency service | Emergency service type |
|---|---|---|
| Number 1 | urn:service:sos.police | Police |
| Number 2 | urn:service:sos.ambulance | First aid |
| Number 3 | urn:service:sos.fire | Fire alarm |
| Number 4 | urn:service:sos.marine | Coast guard |
| Number 5 | urn:service:sos.mountain | Mountain rescue |
| Number 6 | urn:service:sos | Default value |

In Table 2, the number 1 to the number 6 are determined based on a different country or region. The URN is used to identify an emergency service type. When the terminal device obtains an emergency number, the terminal device needs to determine a URN of the emergency number based on the emergency number, so that the terminal device can determine an emergency service type of the emergency number based on the URN. For example, if the terminal device obtains the number 2, the terminal device determines, based on the number 2, that the URN is urn:service:sos.ambulance, to determine that the number 2 is a first aid number.

When the terminal device roams from the HPLMN to a visited public land mobile network (visited public land mobile network, VPLMN), the terminal device re-obtains an emergency number list corresponding to the VPLMN from the globalization parameter configuration file. For details, refer to the following steps.

Step 101: A modem processor of the terminal device receives a PLMN change notification message, where the PLMN change notification message is used to notify that the PLMN on which the terminal device camps is changed.

After obtaining the PLMN change notification message, the terminal device may determine that the terminal device has roamed and registered with the VPLMN, so that the terminal device can communicate with a network by using the VPLMN.

Step 102: The modem processor of the terminal device sends an identifier of the VPLMN to an application processor of the terminal device.

The identifier of the VPLMN is used to uniquely identify the VPLMN, and may be a mobile network code (mobile network code) of the VPLMN, or may be another identifier. Details are not described herein. The modem processor of the terminal device sends the identifier of the VPLMN, so that the application processor can determine, based on the identifier of the VPLMN, the emergency number list corresponding to the VPLMN, and update a stored emergency number list.

Step 103: The application processor of the terminal device updates the currently stored emergency number list to the emergency number list corresponding to the VPLMN based on the identifier of the VPLMN.

The application processor of the terminal device may obtain the emergency number list corresponding to the identifier of the VPLMN from the stored globalization parameter configuration file based on the identifier of the VPLMN, to update the emergency number list.

It should be noted that, after obtaining the emergency number list corresponding to the VPLMN, the terminal device no longer uses the emergency number list corresponding to the HPLMN during a period of camping on the VPLMN, but determines, based on the emergency number list corresponding to the VPLMN, whether a call number is an emergency number. For details, refer to step 104 to step 106.

Step 104: The terminal device obtains a call number entered by the user.

Step 105: The application processor of the terminal device determines whether the call number is a number in the emergency number list corresponding to the VPLMN, where if the call number is the number in the emergency number list corresponding to the VPLMN, go to step 106, or if the call number is not the number in the emergency number list corresponding to the VPLMN, go to step 107.

Step 106: The terminal device displays an emergency number dialing interface.

Step 107: The terminal device displays an ordinary number dialing interface.

Step 108: The application processor of the terminal device delivers a dial command to the modem processor.

In the foregoing procedure, if the user enters an emergency number in the emergency number list corresponding to the HPLMN, the call may fail because the number is not in the emergency number list corresponding to the VPLMN. Therefore, an emergency number call method is required. According to the method, when the user enters the emergency number in the emergency number list corresponding to the HPLMN, the user can call the emergency number.

Figure 2:
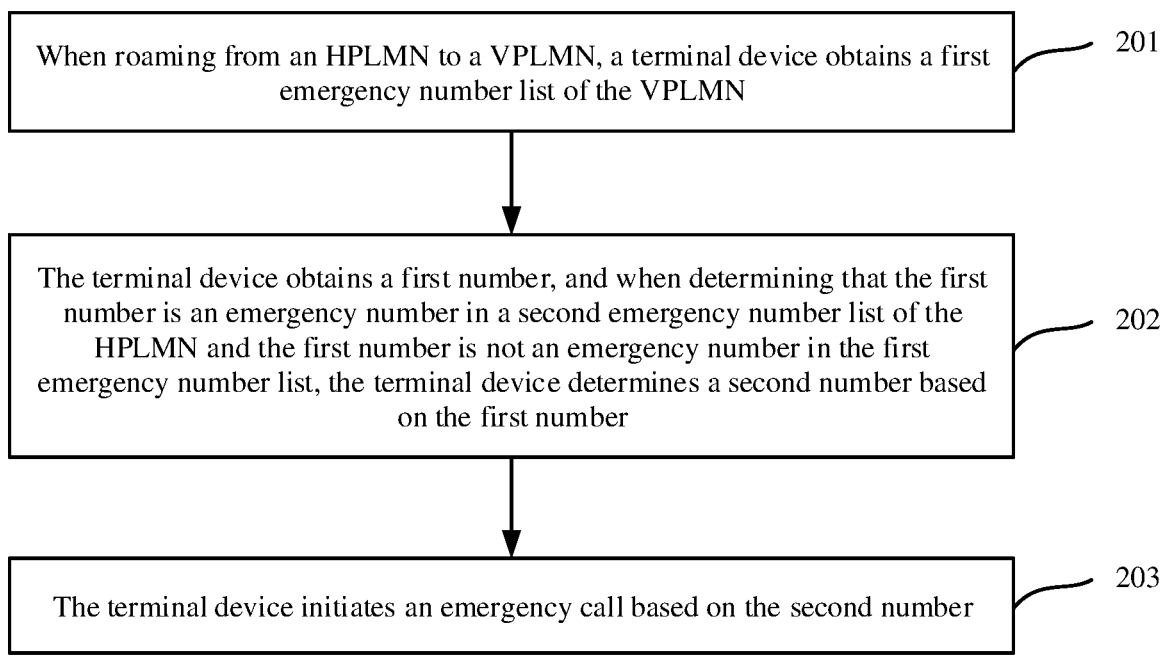
FIG. 2 is a schematic flowchart of a call method according to an embodiment of this application.

With reference to the foregoing description, FIG. 2 is a schematic flowchart of a call method according to an embodiment of this application. Referring to FIG. 2, the method includes the following steps.

Step 201: When roaming from an HPLMN to a VPLMN, a terminal device obtains a first emergency number list of the VPLMN.

The first emergency number list includes at least one emergency number, and each emergency number corresponds to at least one emergency service type.

Step 202: The terminal device obtains a first number, and when determining that the first number is an emergency number in a second emergency number list of the HPLMN and the first number is not an emergency number in the first emergency number list, the terminal device determines a second number based on the first number.

The second number is the emergency number in the first emergency number list, and the second number and the first number correspond to a same emergency service type.

It should be noted that the first number obtained by the terminal device is a number entered by a user when dialing on the terminal device.

Step 203: The terminal device initiates an emergency call based on the second number.

According to the foregoing method, when the first number is the emergency number in the second emergency number list and is not to the emergency number in the first emergency number list, the terminal device may adaptively convert the first number into the second number. Because the second number is an emergency number in a roaming area, the user may also initiate an emergency call by using an emergency number of the HPLMN through the terminal device, so as to resolve a problem that the user cannot accurately dial an emergency number in a different region or country.

In step 201, when roaming to the VPLMN, the terminal device may obtain the first emergency number list from a globalization parameter configuration file stored in the terminal device based on an identifier of the VPLMN, so that the terminal device may replace the second emergency number list of the HPLMN with the first emergency number list.

In step 202, a same emergency number may exist between the first emergency number list and the second emergency number list, or a same emergency number may not exist between the first emergency number list and the second emergency number list, which is described respectively in the following according to different cases.

In a first possible scenario, no same emergency number exists between the first emergency number list and the second emergency number list. When the user dials the first number by using the terminal device, if the first number is an emergency number, the first number may only one of the first emergency number list and the second emergency number list. Therefore, when determining that the first number belongs to the second emergency number list but does not belong to the first emergency number list, the terminal device may determine that the user needs to dial the emergency number in the first emergency number list, to determine the second number from the first emergency number list based on the first number.

Correspondingly, when the first number is not the emergency number in the second emergency number list and the first number is the emergency number in the first emergency number list, it may be determined that the user needs to dial the emergency number in the second emergency number list, so that the terminal device may directly initiate the emergency call based on the first number.

In a second possible scenario, a same emergency number exists between the first emergency number list and the second emergency number list. When the first number is the emergency number in the second emergency number list and the first number is the emergency number in the first emergency number list, the terminal device may display, on a display, a first emergency service type corresponding to the first number in the first emergency number list and a second emergency service type corresponding to the first number in the second emergency number list.

Optionally, when the first number is the emergency number in the second emergency number list and the first number is the emergency number in the first emergency number list, the terminal device may also prompt, in a voice manner, the user to select a required emergency service type from the first emergency service type and the second emergency service type, and the user can trigger a corresponding instruction based on the voice prompt.

The terminal device may determine, according to the instruction of the user, whether to determine the second number. If the terminal device obtains an instruction for making a call based on the first emergency service type, the terminal device determines that the user needs to dial the emergency number in the first emergency number list, to determine the second number from the first emergency number list based on the first number. Correspondingly, if the terminal device obtains an instruction for making a call based on the second emergency service type, the terminal device may determine that the user needs to dial the emergency number in the second emergency number list, to directly initiate the emergency call based on the first number.

Figure 3:
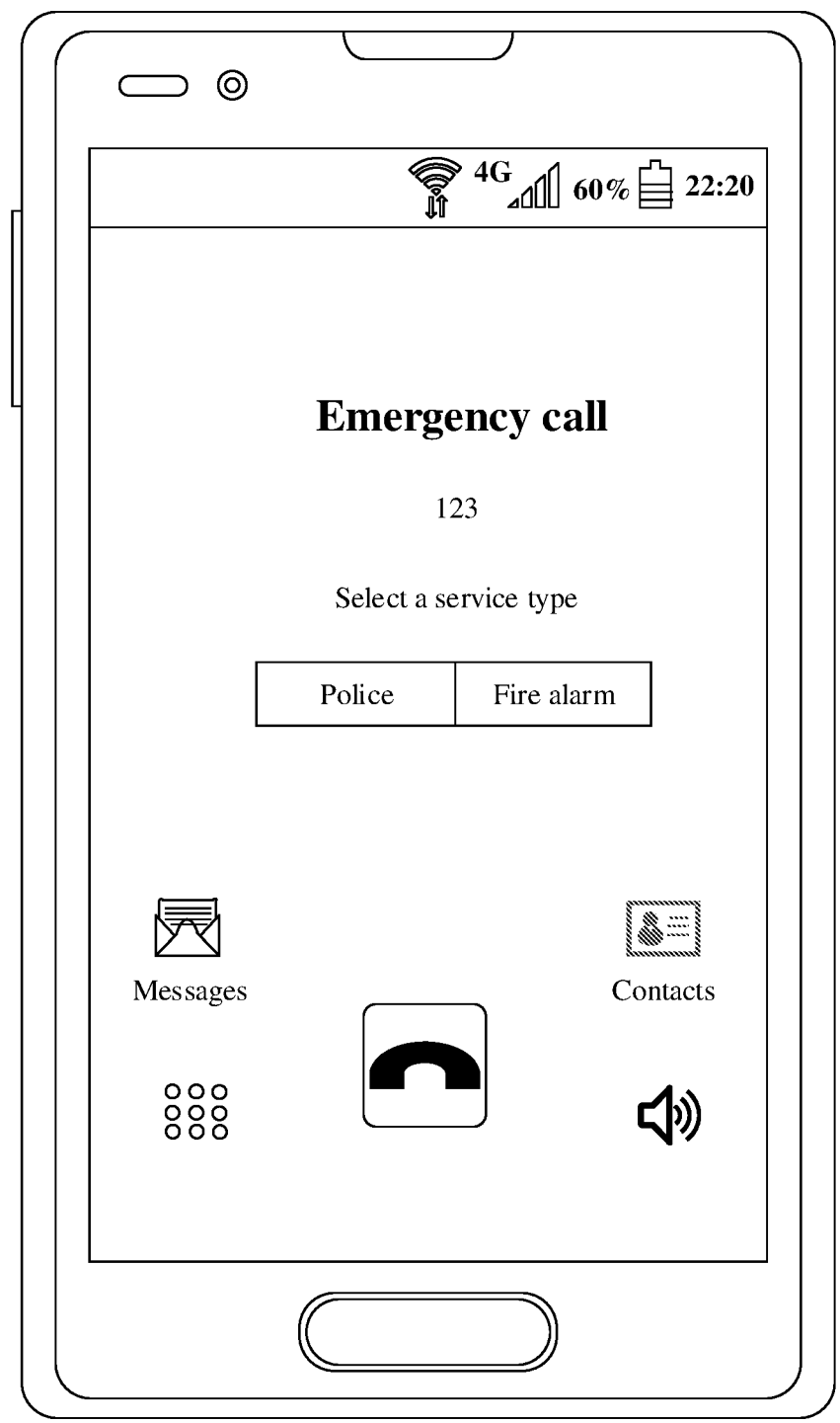
FIG. 3 is a schematic diagram of an emergency call interface according to an embodiment of this application.

For example, the first emergency number list and the second emergency number list each include an emergency number 123. In the first emergency number list, an emergency service type corresponding to the emergency number 123 is the police, and an emergency service type corresponding to an emergency number 456 is the fire alarm. In the second emergency number list, an emergency service type corresponding to the emergency number 123 is the fire alarm. When the user dials 123 by using the terminal device, the terminal device may display the emergency number 123 on the display, and provide an option of the emergency service type: the police and the fire alarm. For details, refer to FIG. 3. The user is in a roaming area and wants to call the fire alarm. In this case, the user can select the fire alarm. If the terminal device determines that the user selects the fire alarm, the terminal device converts the emergency number 123 into a fire alarm number in the roaming area, namely, the emergency number 456 in the first emergency number list. In this case, the terminal device may display the dialed emergency number 456 and the emergency service type: the fire alarm. For details, refer to FIG. 4.

In this embodiment of this application, the emergency number in the first emergency number list and the emergency number in the second emergency number list may correspond to one or more emergency service types. Therefore, when the second number is determined, different operations need to be performed based on different cases, and descriptions are separately provided below.

In a first case, in the first emergency number list, each emergency number corresponds to an emergency service type. In the second emergency number list, each emergency number corresponds to an emergency service type.

In this case, the terminal device may determine, based on the first emergency service type corresponding to the first number, an emergency number corresponding to the first emergency service type from the second emergency number list. The terminal device may determine the emergency number corresponding to the first emergency service type in the second emergency number list as the second number.

Figure 5:
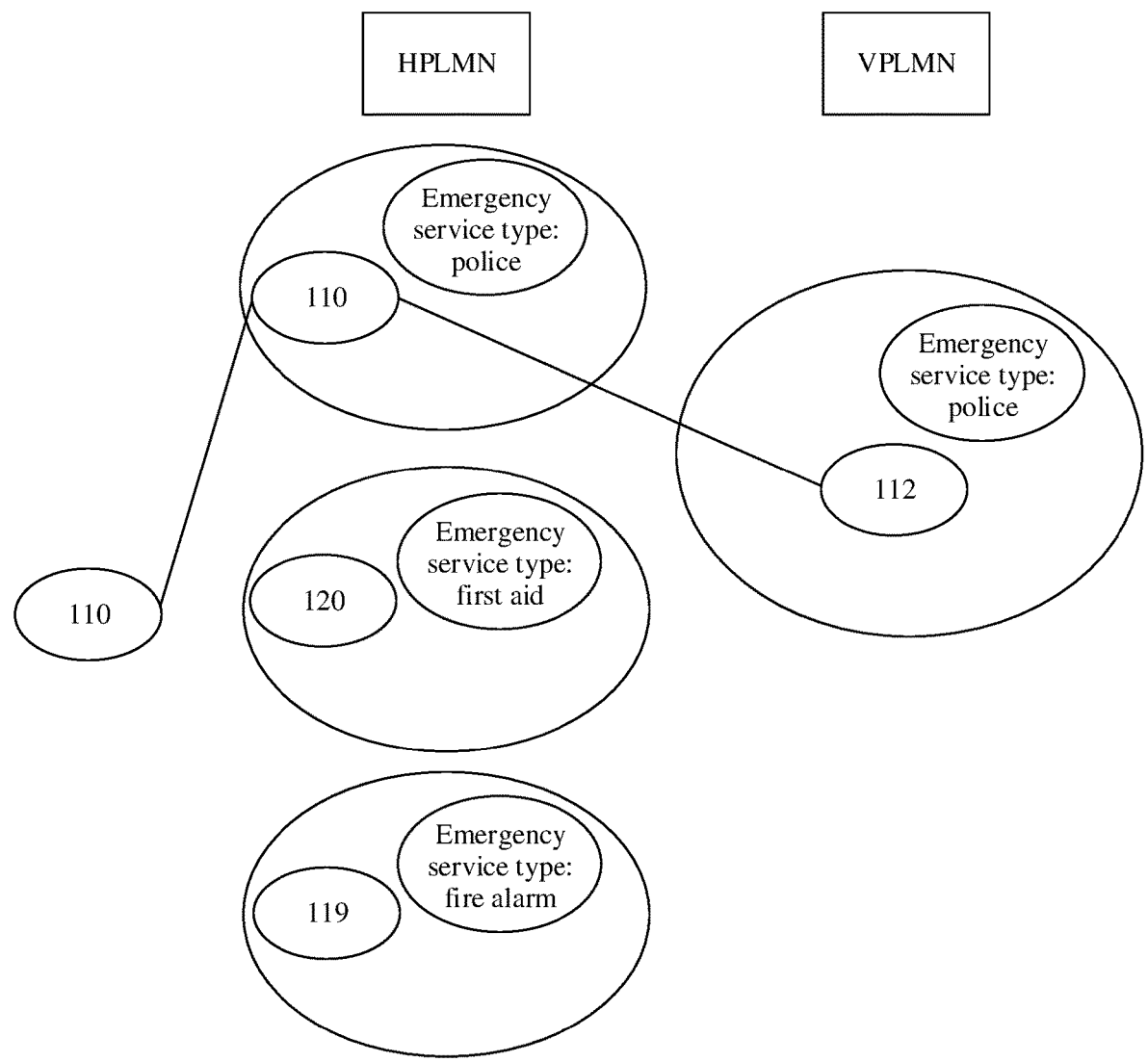
FIG. 5 is a schematic diagram of number conversion according to an embodiment of this application.

For example, in the first emergency number list, an emergency service type corresponding to 112 is the police, and in the second emergency number list, an emergency service type corresponding to no is the police. As shown in FIG. 5, after roaming to the VPLMN, the terminal device obtains that the first number dialed by the user is 110, and the terminal device determines that 110 belongs to the second emergency number list and does not belong to the first emergency number list. In addition, the terminal device determines that the emergency service type of 110 in the second emergency number list is the police. Therefore, the terminal device selects, in the first emergency number list, the emergency service type as the police, that is, 112, and determines 112 as the second number.

It should be noted that, if a CS technology is used in the VPLMN, the second emergency number list may be shown in Table 1. For the terminal device, an emergency service type and an emergency number corresponding to the emergency service type may be distinguished by using a type identifier of the emergency service type. For example, a type identifier of the police is 2. The terminal device may determine an emergency number corresponding to the type identifier 2 in the second emergency number list as a number of the police. Correspondingly, if an IMS technology is used in the VPLMN, the second emergency number list may be shown in Table 2. For the terminal device, an emergency service type and an emergency number corresponding to the emergency service type may be distinguished by using a URN of the emergency service type. For example, a URN of the police is um:service:sos.police, the terminal device may determine that an emergency number corresponding to the URN um:service:sos.police in the second emergency number list is a number of the police.

In a second case, an emergency number corresponding to at least two emergency service types exists in the first emergency number list. In the second emergency number list, each emergency number corresponds to an emergency service type.

In this case, in a first possible scenario, the terminal device uniquely determines, from the second emergency number list based on at least one emergency service type corresponding to the first number in the first emergency number list, an emergency number that corresponds to a same or partially same emergency service type as the at least one emergency service type corresponding to the first number, and the terminal device uses the determined emergency number as the second number.

In this case, in a second possible scenario, the terminal device may determine M emergency numbers from the second emergency number list based on at least one emergency service type corresponding to the first number in the first emergency number list. For any one of the M emergency numbers, an emergency service type corresponding to the emergency number in the second emergency number list is the same as or partially the same as the at least one emergency service type corresponding to the first number in the first emergency number list, and M is an integer greater than 1.

In this case, the terminal device may display the M emergency numbers and emergency service types of the M emergency numbers, and determine the second number according to a received number selection instruction. The number selection instruction is used to select an emergency number from the M emergency numbers as the second number, and M is an integer greater than 1.

Optionally, the terminal device may alternatively convert the M emergency numbers and emergency service types of the M emergency numbers into a voice for playing, and determine the second number according to a received number selection instruction. The number selection instruction is used to select an emergency number from the M emergency numbers as the second number.

Figure 6:
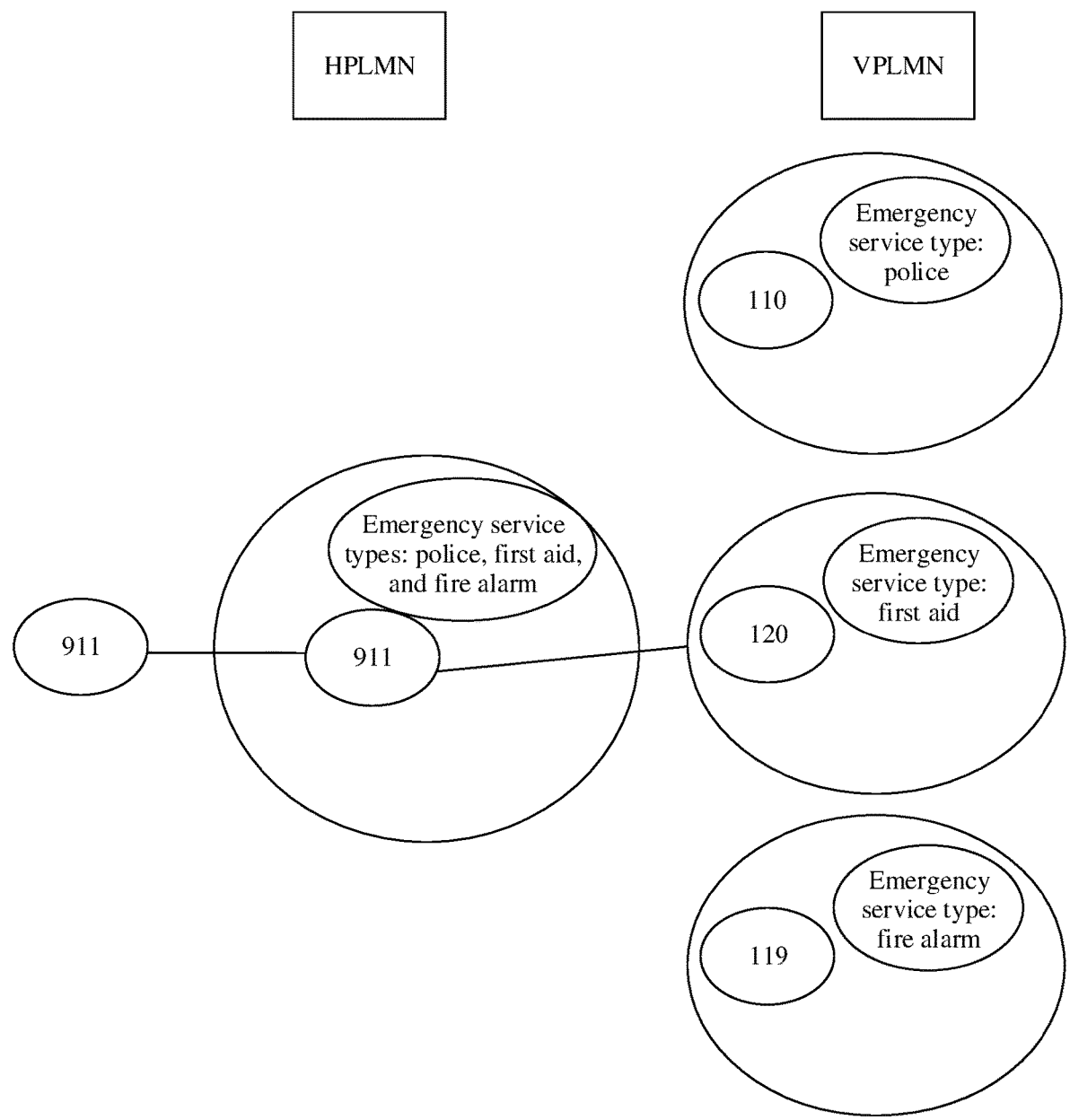
FIG. 6 is a schematic diagram of number conversion according to an embodiment of this application.
Figure 7:
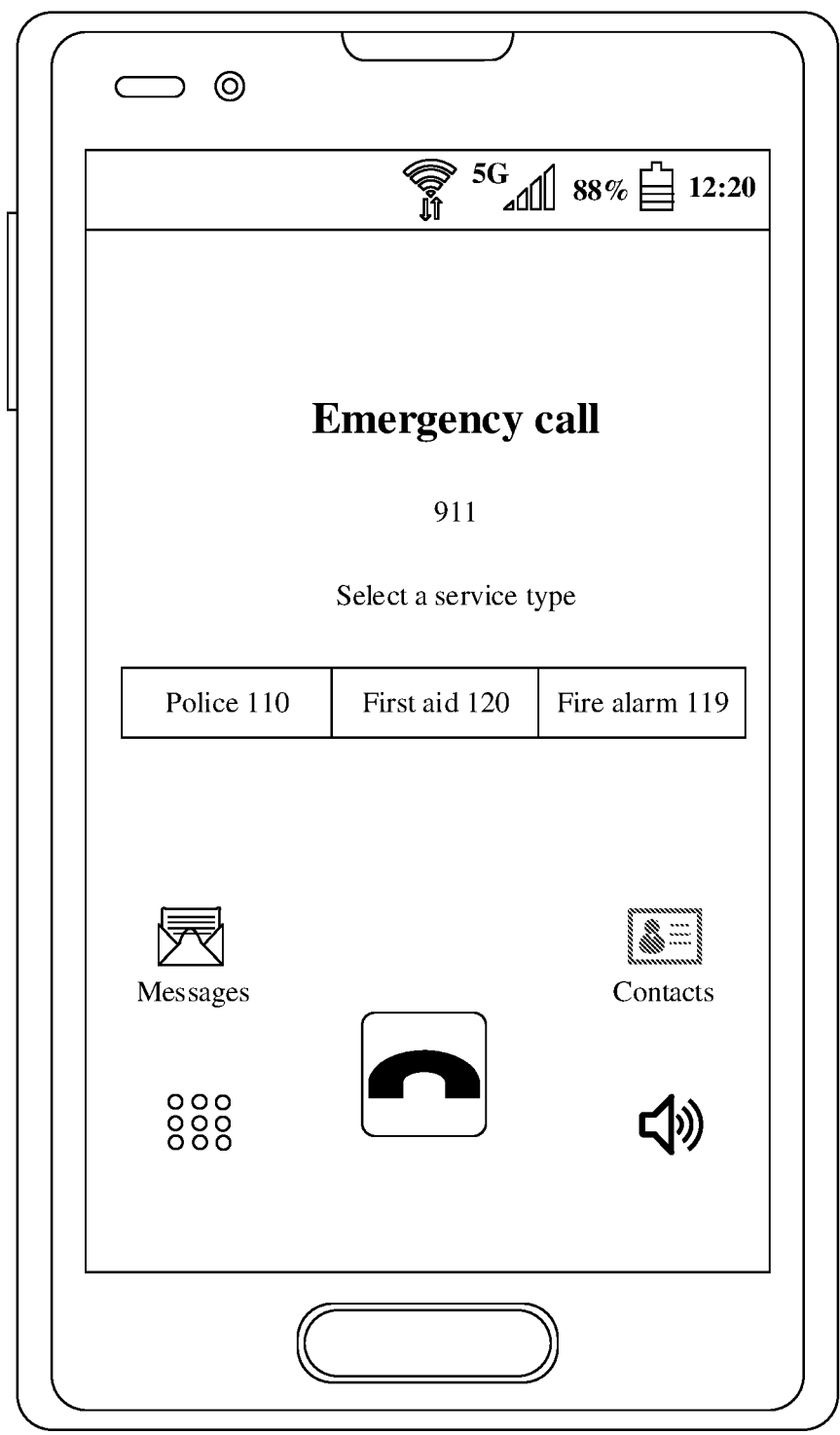
FIG. 7 is a schematic diagram of an emergency call interface according to an embodiment of this application.
Figure 8:
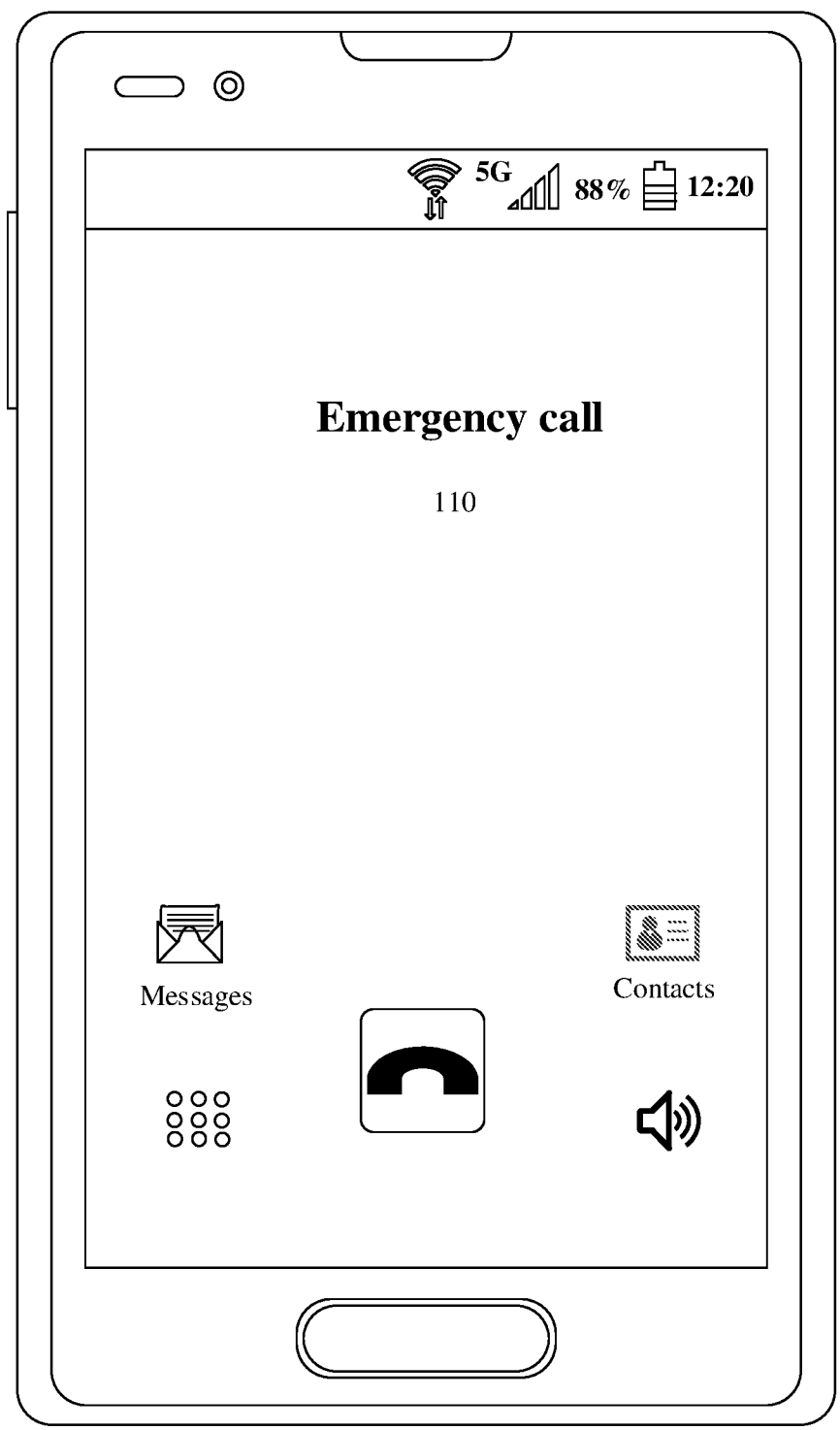
FIG. 8 is a schematic diagram of an emergency call interface according to an embodiment of this application.

For example, in the first emergency number list, an emergency service type corresponding to no is the police, an emergency service type corresponding to 120 is the first aid, and an emergency service type corresponding to 119 is the fire alarm. In the second emergency number list, emergency service types corresponding to 911 are the police, the first aid, and the fire alarm. As shown in FIG. 6, after roaming to the VPLMN, the terminal device obtains that the first number dialed by the user is 911, and the terminal device determines that 911 belongs to the second emergency number list and does not belong to the first emergency number list. In addition, the terminal device determines that the emergency service types of 911 in the second emergency number list are the police, the first aid, and the fire alarm. Therefore, the terminal device displays 110, 120, and 119 on the display, and the emergency service type of each emergency number. For details, refer to FIG. 7. If the user selects the police, the terminal device converts the emergency number 911 into the police number no in the roaming area. In this case, the terminal may display the dialed emergency number no. For details, refer to FIG. 8.

In a third case, in the first emergency number list, each emergency number corresponds to an emergency service type. An emergency number corresponding to at least two emergency service types exists in the second emergency number list.

Similar to the first case, in this case, the terminal device may determine, based on the first emergency service type corresponding to the first number, an emergency number corresponding to the first emergency service type from the second emergency number list. The terminal device may determine the emergency number corresponding to the first emergency service type in the second emergency number list as the second number.

Figure 9:
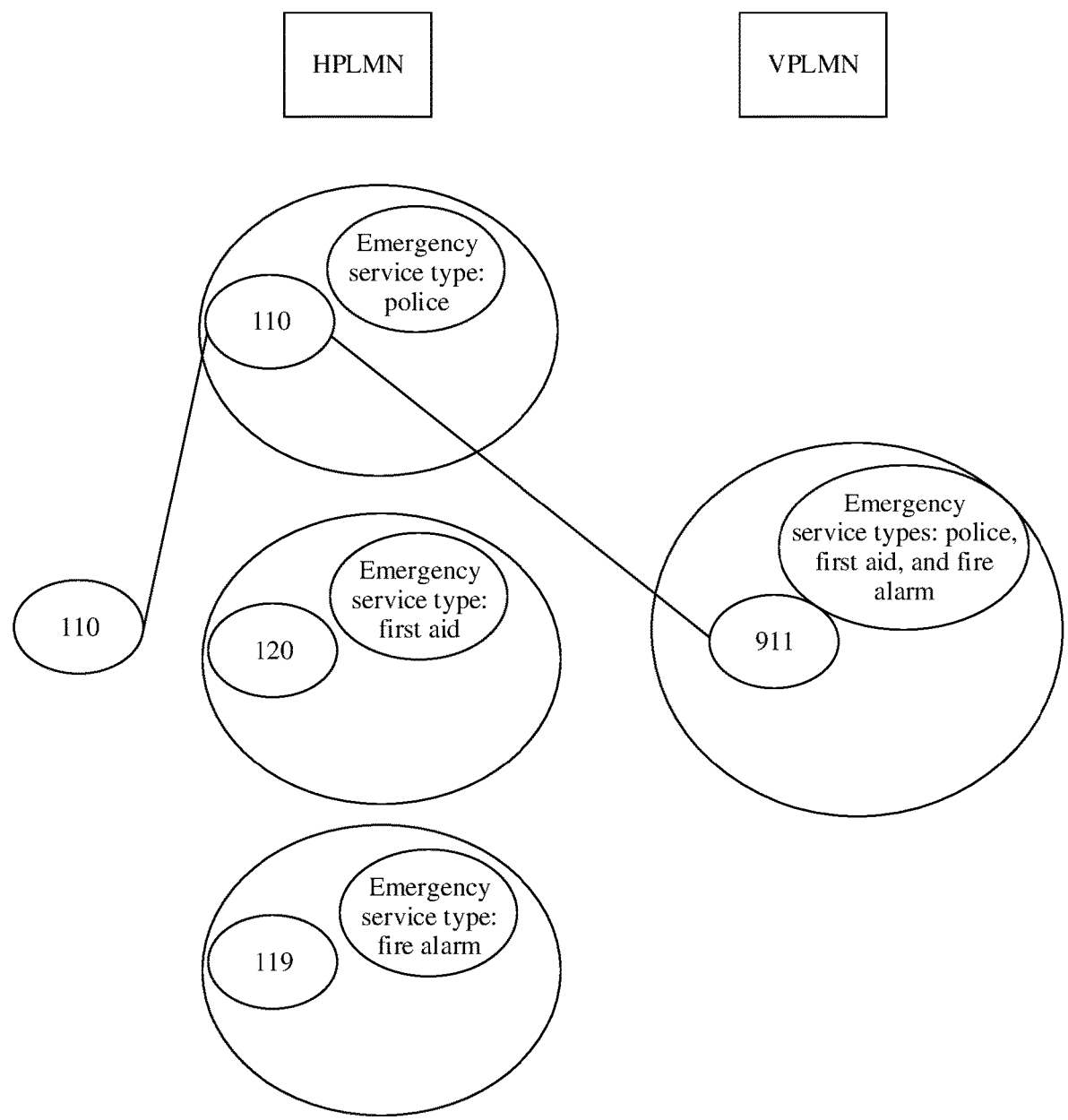
FIG. 9 is a schematic diagram of number conversion according to an embodiment of this application.

For example, in the first emergency number list, the emergency service types corresponding to 911 are the police, the first aid, and the fire alarm. In the second emergency number list, the emergency service type corresponding to no is the police, the emergency service type corresponding to 120 is the first aid, and the emergency service type corresponding to 119 is the fire alarm. As shown in FIG. 9, after roaming to the VPLMN, the terminal device obtains that the first number dialed by the user is no, and the terminal device determines that no belongs to the second emergency number list and does not belong to the first emergency number list. In addition, the terminal device determines that the emergency service type of no in the second emergency number list is the police. Therefore, the terminal device converts the emergency number no into the police number 911 in the roaming area. In this case, the terminal may display the dialed emergency number 911.

The following describes the foregoing process by using a specific embodiment.

Figure 10:
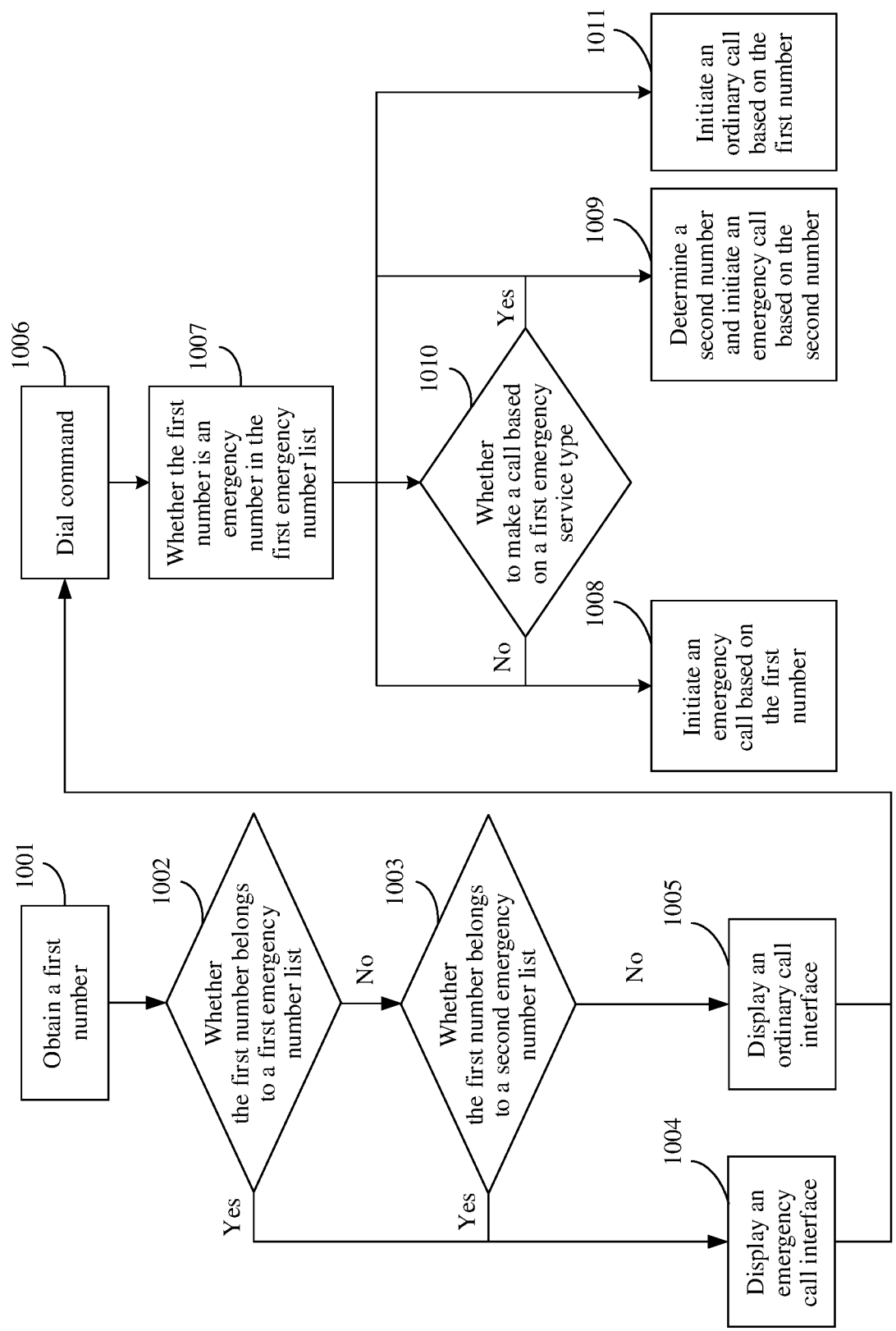
FIG. 10 is a schematic flowchart of a call method according to an embodiment of this application.

FIG. 10 is a schematic flowchart of a call method according to an embodiment of this application.

Step 1001: A terminal device obtains a first number dialed by a user.

Step 1002: An application processor of the terminal device determines whether the first number is an emergency number in a first emergency number list of a VPLMN, where if the first number belongs to the emergency number in the first emergency number list of the VPLMN, go to step 1004, or if the first number is not the emergency number in the first emergency number list of the VPLMN, go to step 1003.

The application processor may also be referred to as a processor, and is not distinguished below.

Step 1003: The application processor of the terminal device determines whether the first number is an emergency number in a second emergency number list of an HPLMN, where if the first number is the emergency number in the second emergency number list of the HPLMN, go to step 1005, or if the first number is not the emergency number in the second emergency number list of the HPLMN, go to step 1004.

Step 1004: The terminal device displays an emergency call interface.

Figure 4:
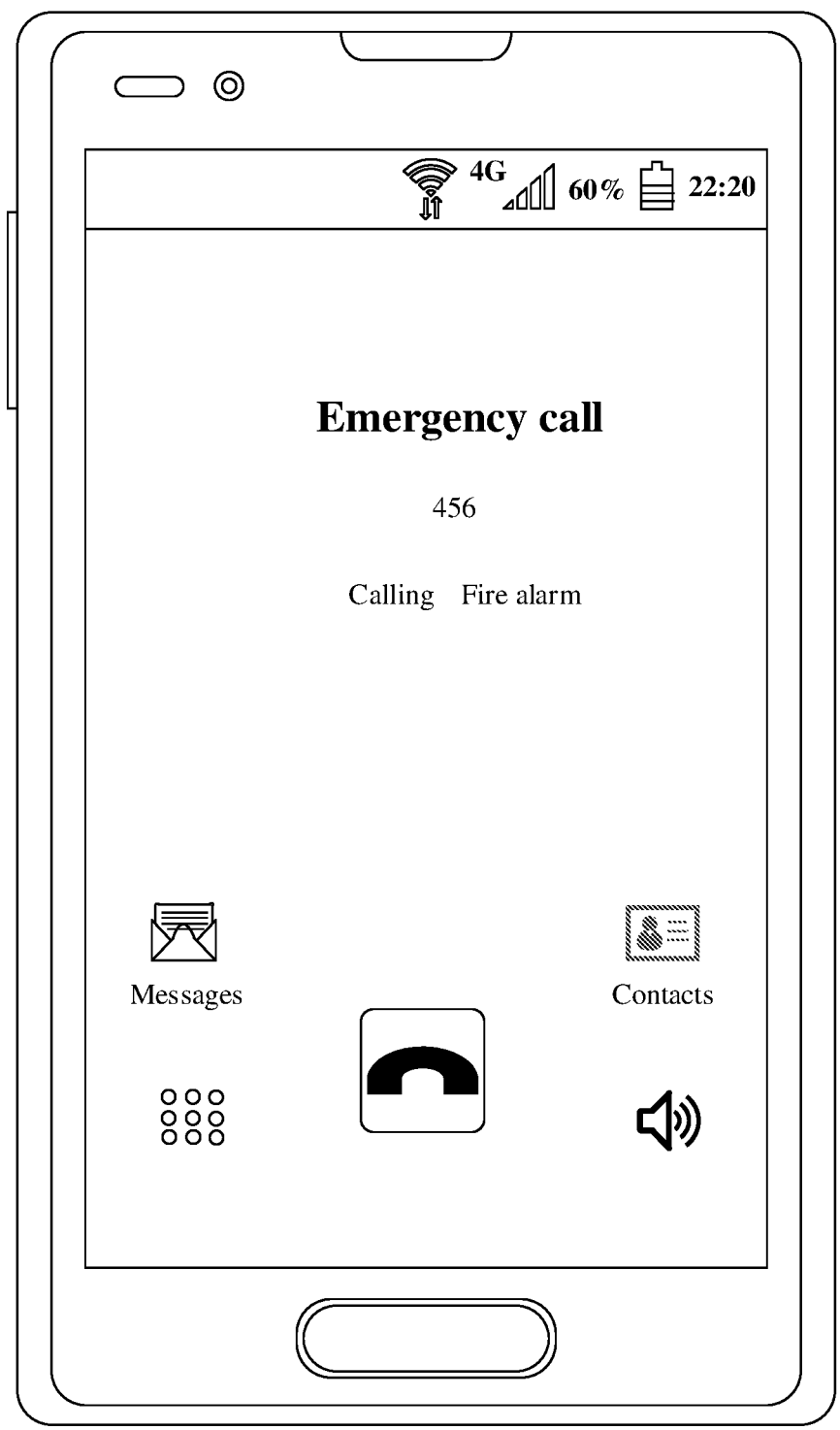
FIG. 4 is a schematic diagram of an emergency call interface according to an embodiment of this application.

The emergency call interface may be shown in FIG. 4, and details are not described herein again.

Step 1005: The terminal device displays an ordinary call interface.

Figure 11:
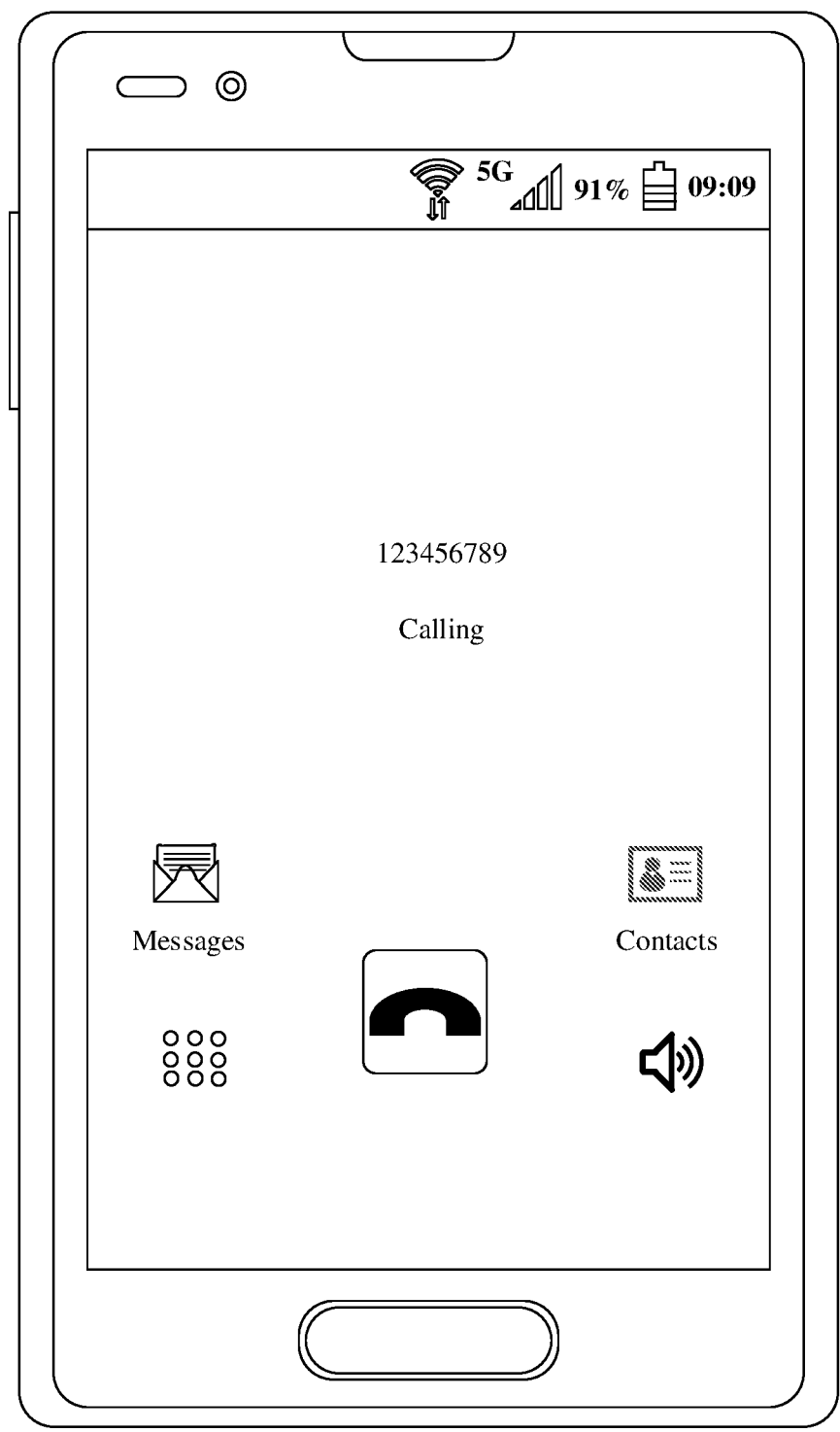
FIG. 11 is a schematic diagram of an ordinary call interface according to an embodiment of this application.

For example, the first number is 123456789, and does not belong to the first emergency number list or the second emergency number list. In this case, the ordinary call interface displayed on the terminal may be shown in FIG. 11.

Step 1006: The application processor of the terminal device indicates a modem processor of the terminal device to deliver a dial command, to indicate the modem processor to call the first number.

The modem processor may also be referred to as a transceiver, and is not distinguished below. In the procedure in FIG. 10, a function of the modem processor may also be implemented by the application processor. This is merely an example, and does not mean that the function can be implemented only by the modem processor.

Step 1007: The modem processor of the terminal device determines whether the first number is the emergency number in the first emergency number list of the VPLMN and whether the first number is the emergency number in the second emergency number list of the HPLMN, where if the first number belongs to the first emergency number list but does not belong to the second emergency number list, go to step 1008, or if the first number belongs to the second emergency number list but does not belong to the first emergency number list, go to step 1009, or if the first number belongs to both the first emergency number list and the second emergency number list, go to step 1010, or if the first number does not belong to the second emergency number list and does not belong to the first emergency number list, go to step 1011.

Step 1008: The modem processor of the terminal device initiates an emergency call based on the first number.

Step 1009: The terminal device determines a second number from the first emergency number list based on the first number, and initiates an emergency call based on the second number.

It should be noted that for a specific process in which the terminal device determines the second number, refer to the foregoing descriptions. Details are not described herein again.

Step 1010: The terminal device displays a first emergency service type corresponding to the first number in the first emergency number list and a second emergency service type corresponding to the first number in the second emergency number list, and obtains a user instruction.

If the instruction for making a call based on the first emergency service type is obtained, go to step 1009, or if the instruction for making a call based on the first emergency service type is not obtained, go to step 1008.

Step 1011: The modem processor of the terminal device initiates an ordinary call based on the first number.

It should be noted that the procedure shown in FIG. 10 is merely an example, and the terminal device may alternatively perform all the foregoing procedures only by using the processor. Details are not described herein again.

Figure 12:
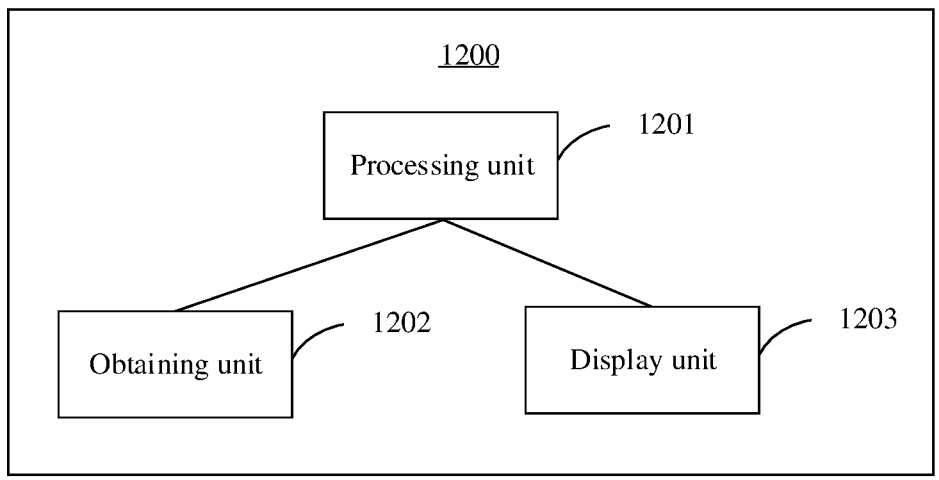
FIG. 12 is a schematic structural diagram of a terminal device according to an embodiment of this application.

FIG. 12 is a schematic structural diagram of a terminal device according to an embodiment of this application. The terminal device may be configured to perform actions of the terminal device in the foregoing method embodiments. The terminal device 1200 includes a processing unit 1201 and an obtaining unit 1202.

The obtaining unit 1202 is configured to: when the terminal device roams from a home public land mobile network HPLMN to a visited public land mobile network VPLMN, obtain a first emergency number list of the VPLMN, where the first emergency number list includes at least one emergency number, and the emergency number corresponds to at least one emergency service type; and obtain a first number.

The processing unit 1201 is configured to: when the first number is an emergency number in a second emergency number list of the HPLMN and the first number is not an emergency number in the first emergency number list, determine a second number based on the first number, where the second number is an emergency number in the first emergency number list, and the second number and the first number correspond to a same emergency service type; and initiate an emergency call based on the second number.

In a possible implementation, the terminal device further includes a display unit 1203.

When the first number is the emergency number in the second emergency number list and the first number is the emergency number in the first emergency number list, the display unit 1203 displays a first emergency service type corresponding to the first number in the first emergency number list and a second emergency service type corresponding to the first number in the second emergency number list.

When obtaining an instruction for making a call based on the second emergency service type, the processing unit 1201 initiates an emergency call based on the first number.

In a possible implementation, when the processing unit 1201 obtains an instruction for making a call based on the first emergency service type, the modem processor determines the second number based on the first number.

The processing unit 1201 initiates an emergency call based on the second number.

In a possible implementation, the processing unit 1201 is specifically configured to: when an emergency number that has a same or partially same emergency service type as at least one emergency service type corresponding to the first number is uniquely determined from the second emergency number list based on the at least one emergency service type corresponding to the first number in the first emergency number list, use the determined emergency number as the second number.

In a possible implementation, the processing unit 1201 is specifically configured to: when M emergency numbers are determined from the second emergency number list based on at least one emergency service type corresponding to the first number in the first emergency number list, determine the second number from the M emergency numbers, where M is an integer greater than 1, and for any one of the M emergency numbers, an emergency service type corresponding to the emergency number in the second emergency number list is the same as or partially the same as the at least one emergency service type corresponding to the first number in the first emergency number list.

In a possible implementation, the terminal device further includes a display unit 1203.

The display unit 1203 displays the M emergency numbers and emergency service types of the M emergency numbers.

The processing unit 1201 determines the second number according to a received number selection instruction, where the number selection instruction is used to select an emergency number from the M emergency numbers as the second number.

In a possible implementation, the processing unit 1201 is specifically configured to: convert the M emergency numbers and emergency service types of the M emergency numbers into a voice for playing; and determine the second number according to a received number selection instruction, where the number selection instruction is used to select an emergency number from the M emergency numbers as the second number.

In a possible implementation, if the first number is not the emergency number in the second emergency number list and the first number is the emergency number in the first emergency number list, the processing unit 1201 initiates an emergency call based on the first number.

Figure 13:
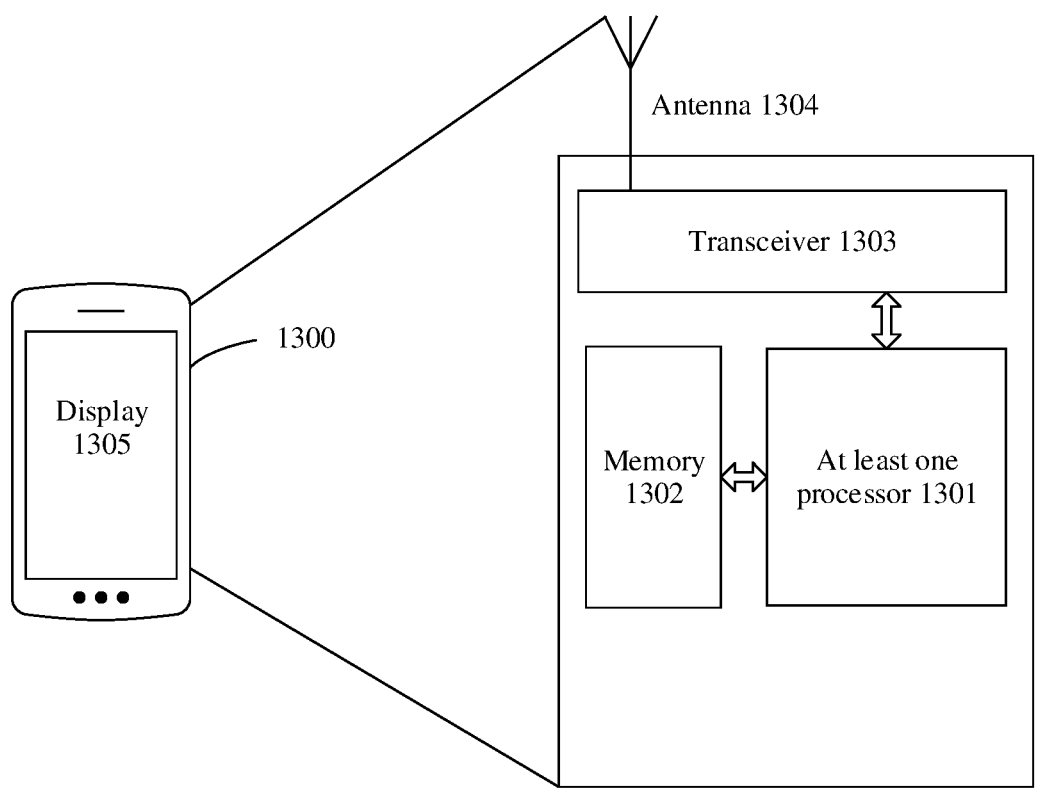
FIG. 13 is a schematic structural diagram of a terminal device according to an embodiment of this application.

FIG. 13 is a schematic structural diagram of a terminal device according to an embodiment of this application. A wireless terminal device shown in FIG. 13 may be an implementation of a hardware circuit of the terminal device shown in FIG. 12. For ease of description, FIG. 13 shows only main components of the terminal device. As shown in FIG. 13, the terminal device 1300 includes at least one processor 1301, a memory 1302, a transceiver 1303, an antenna 1304, and a display 1305 that are coupled to the memory 1302. The at least one processor 1301 is mainly configured to: process a communications protocol and communication data, control the entire wireless terminal device, execute a software program, and process data of the software program, for example, configured to support the terminal device in performing an action described in the foregoing method embodiments, for example, sending a first request message to a first cell. The memory 1302 is mainly configured to store a software program and data. The transceiver 1303 is mainly configured to: perform conversion between a baseband signal and a radio frequency signal, and process the radio frequency signal. The transceiver may also be referred to as a modem processor. The antenna 1304 is mainly configured to cooperate with the transceiver 1303 to receive and send a radio frequency signal in an electromagnetic wave form. The display 1305 is mainly configured to receive an instruction entered by a user, and display an image, data, and the like to the user. The terminal device 1300 may further include another component, for example, a loudspeaker. Details are not described herein.

The memory 1302 is configured to store a computer program.

The at least one processor 1301 is coupled to the memory. The at least one processor 1301 is configured to obtain the computer program stored in the memory 1302, and perform, based on the computer program, the following operations: when the terminal device roams from a home public land mobile network HPLMN to a visited public land mobile network VPLMN, obtaining a first emergency number list of the VPLMN, where the first emergency number list includes at least one emergency number, and the emergency number corresponds to at least one emergency service type; and obtaining a first number, and when the first number is an emergency number in a second emergency number list of the HPLMN and the first number is not an emergency number in the first emergency number list, determining a second number based on the first number, where the second number is an emergency number in the first emergency number list, and the second number and the first number correspond to a same emergency service type; and initiating an emergency call based on the second number.

In a possible implementation, the terminal device further includes the display 1305.

When the first number is an emergency number in the second emergency number list and the first number is an emergency number in the first emergency number list, the display 1305 displays a first emergency service type corresponding to the first number in the first emergency number list and a second emergency service type corresponding to the first number in the second emergency number list.

When obtaining an instruction for making an emergency call based on the second emergency service type, the at least one processor 1301 initiates an emergency call based on the first number.

In a possible implementation, when obtaining the instruction for making a call based on the first emergency service type, the at least one processor 1301 determines the second number based on the first number, and initiates the emergency call based on the second number.

In a possible implementation, the at least one processor 1301 is specifically configured to: when an emergency number that corresponds to a same or partially same emergency service type as at least one emergency service type corresponding to the first number is uniquely determined from the second emergency number list based on the at least one emergency service type corresponding to the first number in the first emergency number list, use the determined emergency number as the second number.

In a possible implementation, the at least one processor 1301 is specifically configured to: when M emergency numbers are determined from the second emergency number list based on at least one emergency service type corresponding to the first number in the first emergency number list, determine the second number from the M emergency numbers, where M is an integer greater than 1, and for any one of the M emergency numbers, an emergency service type corresponding to the emergency number in the second emergency number list is the same as or partially the same as the at least one emergency service type corresponding to the first number in the first emergency number list.

In a possible implementation, the display 1305 displays the M emergency numbers and emergency service types of the M emergency numbers.

The at least one processor 1301 determines the second number according to a received number selection instruction, where the number selection instruction is used to select an emergency number from the M emergency numbers as the second number.

In a possible implementation, the at least one processor 1301 is further configured to: convert the M emergency numbers and emergency service types of the M emergency numbers into a voice for playing; and determine the second number according to a received number selection instruction, where the number selection instruction is used to select an emergency number from the M emergency numbers as the second number.

In a possible implementation, the at least one processor 1301 is further configured to: if the first number is not the emergency number in the second emergency number list and the first number is the emergency number in the first emergency number list, initiate the emergency call based on the first number.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies in this application.

What is claimed is:

1. A method, comprising:
   when roaming from a home public land mobile network (HPLMN) to a visited public land mobile network (VPLMN), obtaining, by a terminal device, a first emergency number list of the VPLMN, wherein the first emergency number list comprises at least one emergency number, each emergency number in the first emergency number list is an emergency number configured for use in the VPLMN, and the at least one emergency number corresponds to at least one emergency service type;
   obtaining, by the terminal device, a first number;
   in response to the first number being comprised in a second emergency number list of the HPLMN and the first number not being comprised in the first emergency number list, determining a second number based on the first number, wherein the second number is comprised in the first emergency number list, and the second number and the first number correspond to a same emergency service type, each emergency number in the second emergency number list is an emergency number configured for use in the HPLMN, and initiating, by the terminal device, an emergency call based on the second number; and
   in response to the first number being comprised in the second emergency number list and the first number also being comprised in the first emergency number list, performing the following:
      displaying a first emergency service type corresponding to the first number in the first emergency number list and a second emergency service type corresponding to the first number in the second emergency number list;
      in response to obtaining an instruction for making a call based on the second emergency service type, determining, by the terminal device, the second number based on the first number, and initiating, by the terminal device, an emergency call based on the second number; and
      in response to obtaining an instruction for making a call based on the first emergency service type, initiating, by the terminal device, the emergency call based on the first number.

2. The method according to claim 1, wherein determining, by the terminal device, the second number based on the first number comprises:
   in response to uniquely determining, from the first emergency number list based on at least one emergency service type corresponding to the first number in the second emergency number list, an emergency number that corresponds to a same or partially same emergency service type to be the at least one emergency service type corresponding to the first number, using, by the terminal device, the determined emergency number as the second number.

3. The method according to claim 1, wherein determining, by the terminal device, the second number based on the first number comprises:

in response to determining M emergency numbers from the first emergency number list based on at least one emergency service type corresponding to the first number in the second emergency number list, determining, by the terminal device, the second number from the M emergency numbers, wherein M is an integer greater than 1, and for each of the M emergency numbers, an emergency service type corresponding to the respective emergency number in the first emergency number list is the same as or partially the same as the at least one emergency service type corresponding to the first number in the second emergency number list.

4. The method according to claim 3, wherein determining, by the terminal device, the second number from the M emergency numbers comprises:

displaying, by the terminal device, the M emergency numbers and emergency service types of the M emergency numbers, and determining the second number according to a received number selection instruction, wherein the number selection instruction is used to select an emergency number from the M emergency numbers as the second number.

5. The method according to claim 3, wherein determining, by the terminal device, the second number from the M emergency numbers comprises:

converting, by the terminal device, the M emergency numbers and emergency service types of the M emergency numbers into a voice to be audio played, and determining the second number according to a received number selection instruction, wherein the number selection instruction is used to select an emergency number from the M emergency numbers as the second number.

6. The method according to claim 1, further comprising:

in response to the first number not being comprised in the second emergency number list and the first number being comprised in the first emergency number list, initiating the emergency call based on the first number.

7. The method according to claim 1, wherein the first emergency number list is obtained from a globalization parameter configuration file stored in the terminal device that is mapped to an identifier of the VPLMN.

8. A terminal device, comprising:

a memory, configured to store a computer program; and
at least one processor coupled to the memory, wherein the at least one processor is configured to obtain the computer program stored in the memory, and to perform, based on the computer program, the following operations:

when the terminal device roams from a home public land mobile network (HPLMN) to a visited public land mobile network (VPLMN), obtaining a first emergency number list of the VPLMN, wherein the first emergency number list comprises at least one emergency number, each emergency number in the first emergency number list is an emergency number configured for use in the VPLMN, and the at least one emergency number corresponds to at least one emergency service type;

obtaining a first number;
in response to the first number being comprised in a second emergency number list of the HPLMN and the first number not being comprised in the first emergency number list, determining a second number based on the first number, wherein the second number is comprised in the first emergency number list, each emergency number in the second emergency number list is an emergency number configured for use in the HPLMN, and the second number and the first number correspond to a same emergency service type, and initiating an emergency call based on the second number; and in response to the first number being comprised in the second emergency number list and the first number also being comprised in the first emergency number list, performing the following:

displaying a first emergency service type corresponding to the first number in the first emergency number list and a second emergency service type corresponding to the first number in the second emergency number list;

in response to obtaining an instruction for making a call based on the second emergency service type, determining the second number based on the first number, and initiating, by the terminal device, an emergency call based on the second number; and in response to obtaining an instruction for making a call based on the first emergency service type, initiating the emergency call based on the first number.

9. The terminal device according to claim 8, wherein the at least one processor is configured to perform, based on the computer program, the following operations:

in response to an emergency number that corresponds to a same or partially same emergency service type as at least one emergency service type corresponding to the first number being uniquely determined from the first emergency number list based on the at least one emergency service type corresponding to the first number in the second emergency number list, use the determined emergency number as the second number.

10. The terminal device according to claim 8, wherein the at least one processor is configured to perform, based on the computer program, the following operations:

in response to M emergency numbers being determined from the first emergency number list based on at least one emergency service type corresponding to the first number in the second emergency number list, determining the second number from the M emergency numbers, wherein M is an integer greater than 1, and for each of the M emergency numbers, an emergency service type corresponding to the respective emergency number in the first emergency number list is the same as or partially the same as the at least one emergency service type corresponding to the first number in the second emergency number list.

11. The terminal device according to claim 10, further comprising:

a display; and
wherein the at least one processor is configured to perform, based on the computer program, the following further operations:

display, using the display, the M emergency numbers and emergency service types of the M emergency numbers; and determining the second number according to a received number selection instruction, wherein the number selection instruction is used to select an emergency number from the M emergency numbers as the second number.

12. The terminal device according to claim 10, wherein the at least one processor is configured to perform, based on the computer program, the following further operations:
converting the M emergency numbers and the emergency service types of the M emergency numbers into a voice to be audio played; and
determining the second number according to the received number selection instruction, wherein the received number selection instruction is used to select an emergency number from the M emergency numbers as the second number.

13. The terminal device according to claim 8, wherein the at least one processor is configured to perform, based on the computer program, the following further operations:
in response to the first number not being comprised in the second emergency number list and the first number being comprised in the first emergency number list, initiate the emergency call based on the first number.

14. A non-transitory computer program product, comprising computer-readable instructions, wherein the computer-readable instructions, when executed by a terminal device, cause the terminal device to:
when the terminal device roams from a home public land mobile network (HPLMN) to a visited public land mobile network (VPLMN), obtain a first emergency number list of the VPLMN, wherein the first emergency number list comprises at least one emergency number, each emergency number in the first emergency number list is an emergency number configured for use in the VPLMN, and the at least one emergency number corresponds to at least one emergency service type;
obtain a first number;
in response to the first number being comprised in a second emergency number list of the HPLMN and the first number not being comprised in the first emergency number list, determine a second number based on the first number, wherein the second number is comprised in the first emergency number list, and each emergency number in the second emergency number list is an emergency number configured for use in the HPLMN, and the second number and the first number correspond to a same emergency service type, and initiate an emergency call based on the second number; and
in response to the first number being comprised in the second emergency number list and the first number also being comprised in the first emergency number list, perform the following:
display a first emergency service type corresponding to the first number in the first emergency number list and a second emergency service type corresponding to the first number in the second emergency number list;
in response to obtaining an instruction for making a call based on the second emergency service type, determine the second number based on the first number, and initiate an emergency call based on the second number; and
in response to obtaining an instruction for making a call based on the first emergency service type, initiate the emergency call based on the first number.

\* \* \* \* \*